Sept. 3, 1940.  F. W. KRAUSE  2,213,818
WALL PLUG
Filed March 23, 1938
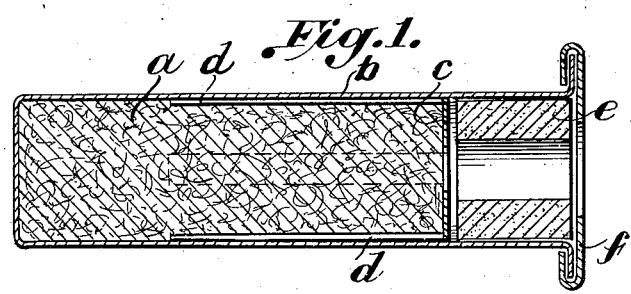
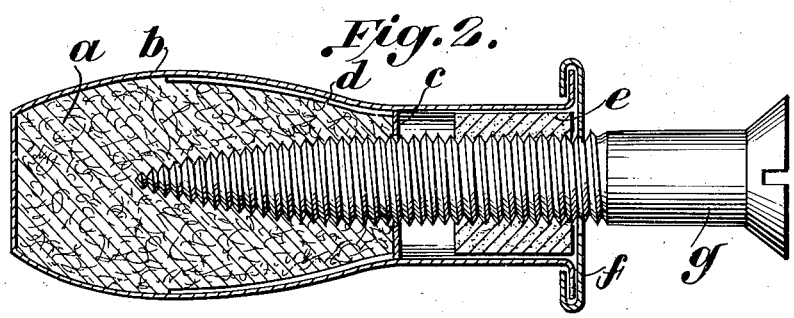
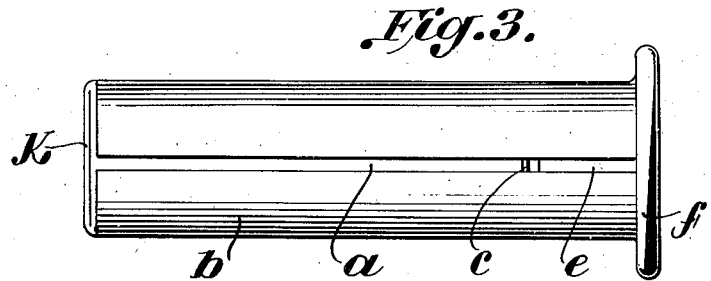
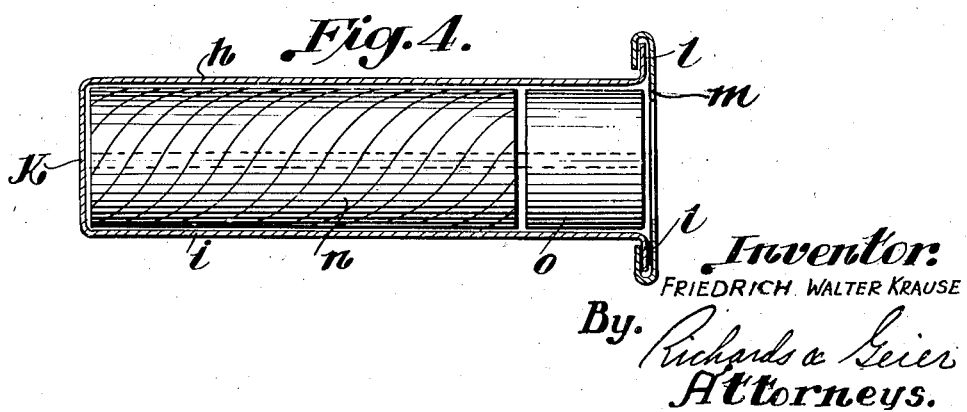
Inventor:
FRIEDRICH WALTER KRAUSE
By Richards & Geier
Attorneys.

Patented Sept. 3, 1940

2,213,818

UNITED STATES PATENT OFFICE 2,213,818

WALL PLUG

Friedrich Walter Krause, Hamburg, Germany

Application March 23, 1938, Serial No. 197,589
In Germany March 23, 1937

5 Claims. (Cl. 85—2.4)

This invention relates to a wall plug which consists of a sleeve which is closed at one end and is preferably slit longitudinally and contains an axially compressible fibrous material in front of which is a member by which the thread of the screw which is to be inserted into the wall plug can be gripped. The object of the invention is to provide an improved wall plug into which the screw can be screwed easily and by which it is securely held.

Wall plugs which contain an axially compressible mass and a nut which is disposed in front of this mass and grips the thread of the screw which is to be screwed into the plug are known. In these known wall plugs the axial displacement of the fibrous material must be effected by hammering the screw. If now the blow on the screw is too heavy the resistance of the compressed mass becomes so great that the screw breaks. If, on the other hand, the blow is too light the maximum holding power which is obtained when a blow of the proper strength is delivered is not obtained. In any case the hammering must be done by feel and the probability that a blow of the correct strength will be delivered is very small.

With the wall plug of the present invention, this necessity for delivering a blow on the screw by feel is obviated, owing to the fact that the force exerted by hammering must always be such that the fibrous mass is compressed to the extent necessary for obtaining the maximum holding power. The wall plug therefore always exerts its maximum holding power no matter whether the holes in the wall are of larger or smaller size.

According to the invention, this result is obtained by covering the compressible mass with an axially displaceable disc, which is preferably provided with guiding arms, and can be driven forward by the point of the screw or other fastening means, and of which the strength is such that the fastening means can only penetrate through it when the resistance offered by the compressible means to further advance of the fastening means has reached a predetermined value. This value of the resistance of the compressible mass can be readily determined when the wall plug is made and the strength of the disc can be adjusted accordingly. The hammering on the screw must then be continued until the screw can be screwed without difficulty into the plug of fibrous material. The screw cannot be hammered too heavily because, after the resistance of the fibrous material has reached the desired value, the screw penetrates the disc and enters the fibrous mass.

If the member in front of the fibrous material which grips the threads of the screw is made of an imperforate body of fibrous material, it must first be pierced with a pointed implement in order to expand the fibrous material radially without displacing the member axially. It has now been found, however, that this preliminary piercing is no longer necessary if the member which grips the threads of the screw is made of a body of fibrous material which can be extended without axial counter-pressure being applied and of which the fibres run parallel to the axial direction of the body and are not intertwisted. Then it is unnecessary either to hammer the screw or to pierce the member which grips the threads and the screw can be directly screwed in.

If a fibrous body of this nature which can be expanded without the application of axial counter-pressure is used as a nut for gripping the thread of the screw which is to be secured in the plug and is combined with a body of fibrous material which forms the compressible fibrous mass and of which the strands or fibres are twisted together in the same sense as the threads of the screw and therefore offer so much assistance to the advance of the screw that the body is deformed owing to the compression and expanded before the thread of the screw enters it, then the arrangement of the axially displaceable disc as a cover for this fibrous material is no longer necessary and an extremely simple wall plug is obtained in which the screw can be screwed in without hammering or piercing being necessary.

Various forms of wall plugs in accordance with the invention are illustrated by way of example in the accompanying drawing, in which Figure 1 is a longitudinal section through a wall plug of fibrous material having a displaceable covering plate.

Figure 2 is a longitudinal section through the same plug after a screw has been screwed into it.

Figure 3 is an elevation of the plug, and

Figure 4 is a longitudinal section through a wall plug of fibrous material but without a displaceable covering plate.

Referring to the drawing, in Figure 1 a is the fibrous material which, as shown in Figure 2, can be axially displaced inside the casing b of the plug which is made of stronger material. When the material a is displaced the casing b is distended as shown. In front of the fibrous mass a is mounted a disc c which is preferably provided with guide arms d in order to prevent the disc from being canted. The disc is perforated, indented, or slit to a greater or less extent according to the strength of the material of which the disc is made, so that the bending which is necessary for allowing the screw to pass through it takes place when the fibrous mass a has been compressed to the right extent. It is obvious that, owing to the uniform resistance of the disc c to expansion, the fibrous mass a is axially compressed until the outer periphery of the plug has adapted itself to the shape of the hole in the wall, the casing b being distended, and that, owing to the back pressure exerted by the wall of the hole, the fibrous mass *a* attains a definite density which always remains constant before the disc *c* is expanded by the screw which then penetrates into the plug of fibrous material formed in which it finds a secure hold. The whole process is a positive one.

In Figures 1 and 2 the reference *e* designates a nut which is held in place by the cap *f* and acts as a means for gripping the threads of the screw which passes through it, so that the forward movement of the disc *c* is then effected by screwing in the screw *g*. In this form of construction it is unnecessary to strike the screw with a hammer. The disc *c* can, however, also be used advantageously without this nut. The fibrous mass *a* then extends to the cap *f* under which the axially displaceable disc *c* is mounted. Hammering the screw cannot then be avoided, but when the screw is struck it is not possible to compress the fibrous mass insufficiently and consequently to obtain insufficient holding power.

The wall plug which is illustrated in Figure 4 also possesses a sleeve-like casing which is preferably made of sheet metal and is formed of two parts *h* and *i* which are connected by a bottom *k*. The free ends of the parts *h* and *i* are each bent over to form a flange *l* which acts as an abutment. The plug is closed by a cap *m* having a central opening for the insertion of a screw which is not illustrated in the drawing.

The helically wound body *n* of strands of fibrous material which are twisted together is fitted inside the sleeve-like casing. Above this body *n* is mounted a body *o* which is also cylindrical and of which the fibres or threads run parallel to one another in the direction of the axis of the plug. This body *o* is held in position by the cap *m*.

Owing to the arrangement which has been described, a screw can be screwed into the body *o* without hammering or piercing being necessary, because the body *o* offers no axial resistance but separates radially and therefore forms a nut for the screw. The outer parts of the cylinder *o* bear against the sleeve-like casing *h, i*, the cap *m* acting as a support or an abutment.

The cylindrical body *n*, on the other hand, which consists of a number of threads or strands which are twisted rope-like in the sense of the thread of the screw offers axial resistance to the advance of the screw. The result of this is that, when the screw is rotated, the body *n* is compressed, the consequence of this compression being that a tubular displacement of the threads or strands takes place and radial expansion of the plug takes place until the plug bears against and is firmly held in the hole in the wall before the screw penetrates the plug of fibrous material and obtains a hold therein.

With this wall plug it is therefore possible to insert the screws without either perforating the plug or hammering the screw. The body *o* can be formed in any suitable manner, for example of fibres which run parallel to the axis of the plug and are not intertwisted or of a number of threads which are kept in tubular form or are braided.

The manner in which the bodies *n* and *o* are bound together is also immaterial. This can be done by suitably moulding the fibrous material or by means of suitable impregnating agents of different plasticity. It is essential, however, that the part in the front of the casing should separate easily in a radial direction and that a screw can be screwed into it without being hammered. The part in the rear of the casing should be such that it offers an axial resistance to the penetration of the screw, being thereby compressed and extending radially, before the screw penetrates into it, which result can be obtained by a special form of bonding, namely either by interfelting, intertwisting, interbraiding or impregnation with plastic media.

Instead of the single body *n* two or more can be provided which are situated one behind the other and are of similar construction and consequently have the same effect as a single body. This subdivision has the advantage that the same body of fibrous material can be used for plugs of different lengths, only casings of different lengths being necessary.

I claim:

1. A wall plug comprising a casing which is closed at one end and is preferably slit longitudinally and contains a fibrous mass or material which can be compressed in an axial direction and a member disposed in front of the fibrous mass or material which is adapted to grip the threads of the screw to be screwed into the plug, wherein the compressible fibrous material is covered by an axially displaceable disc which is driven forwards by the point of the fastening member and of which the strength is such that the fastening member only penetrates it when the resistance which the compressed mass offers to the further advance of the disc has reached a predetermined value.

2. A wall plug in accordance with claim 1 wherein the disc is provided with guide arms.

3. A wall plug in accordance with claim 1 in which the member which grips the threads of the screw consists of a body of fibrous material which an be easily expanded without the application of axial counter-pressure and of which the fibres are parallel to the axis of the body and are not intertwisted.

4. A wall plug comprising a casing which is closed at one end, a fibrous mass situated in said casing, a screw for compressing said mass in an axial direction, and separate means disposed in front of said fibrous mass and adapted to grip and guide the threads of said screw to be screwed into the plug, said screw penetrating the fibrous mass after the mass has been compressed.

5. A wall plug comprising a casing which is closed at one end and has a longitudinal slit formed therein, a fibrous mass situated in said casing, a screw for compressing said mass in an axial direction, said fibrous mass consisting of a braided strand, the space within which is smaller than the shank of said screw to be screwed into the plug, so that the fibrous body is compressed before it is gripped by the thread of said screw, and a member of fibrous material disposed in front of said fibrous mass and consisting of a number of strands forming a tube adapted to grip the threads of said screw and to guide said threads.

FRIEDRICH WALTER KRAUSE.